May 17, 1932.  A. S. HOWELL  1,859,207
PHOTOGRAPHIC CAMERA
Filed Dec. 23, 1929  3 Sheets-Sheet 1

Inventor
Albert S. Howell
By Miehle & Miehle,
Atty's

May 17, 1932.  A. S. HOWELL  1,859,207
PHOTOGRAPHIC CAMERA
Filed Dec. 23, 1929  3 Sheets-Sheet 2
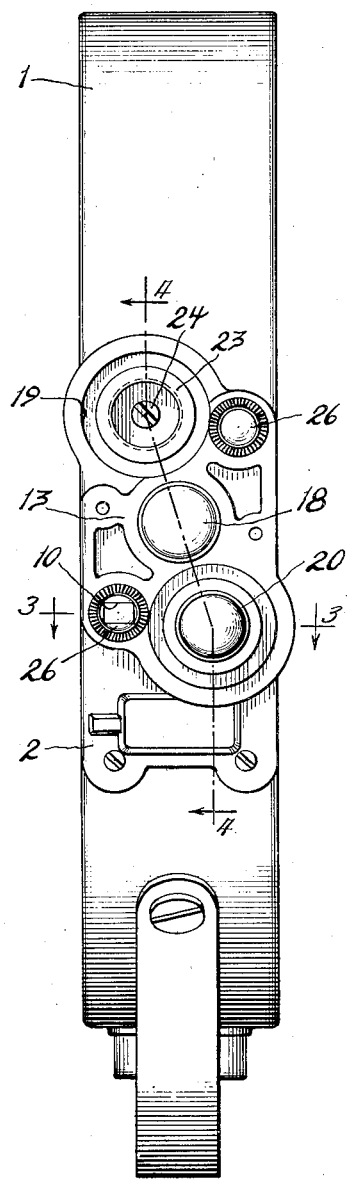
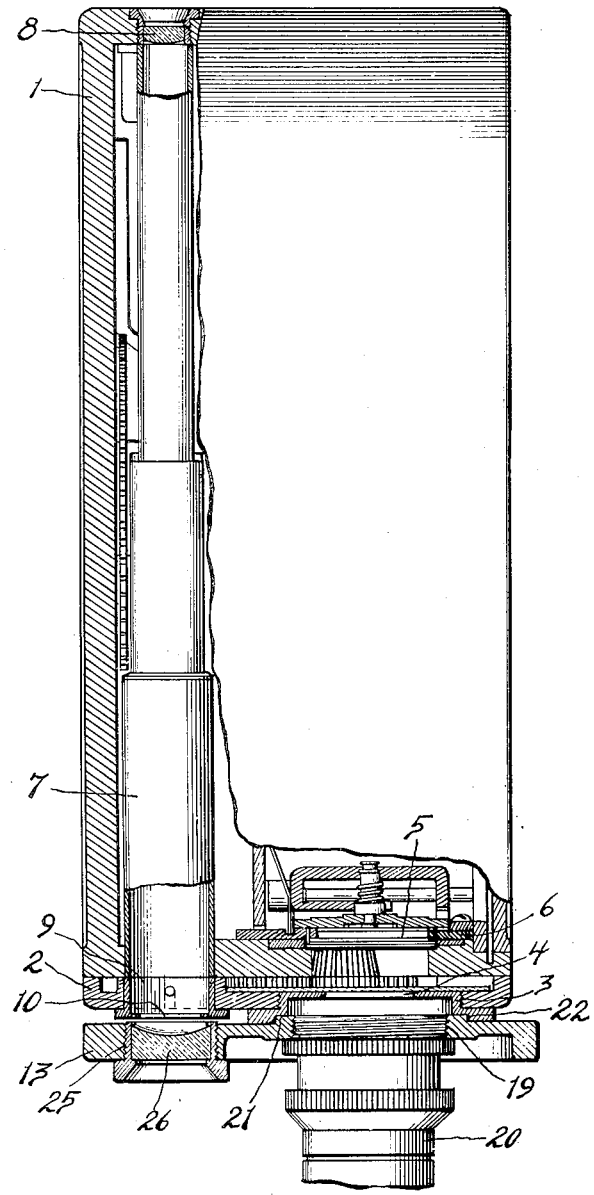

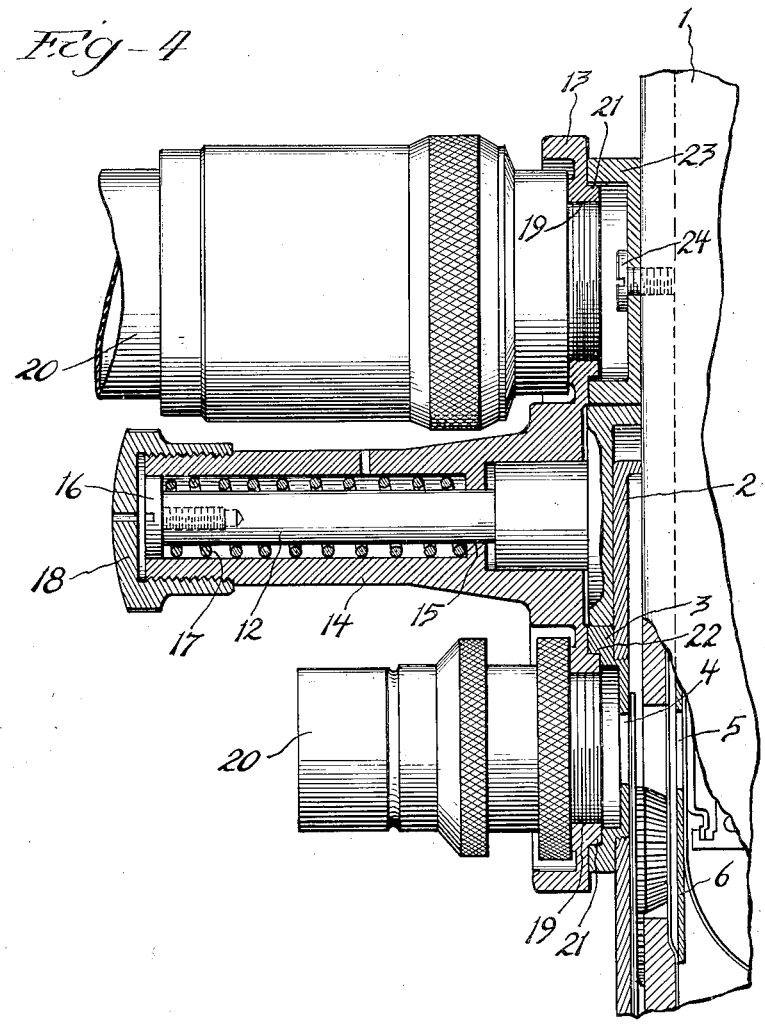

Patented May 17, 1932

1,859,207

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

PHOTOGRAPHIC CAMERA

Application filed December 23, 1929. Serial No. 415,908.

My invention relates to a lens turret construction of a photographic camera whereby a number of lenses may be selectively brought into operative or photographing position.

Certain objects of the invention reside in the provision of a lens turret construction which is compact, simple and effective and which is particularly adapted to the construction of a certain motion picture camera of the field or outdoor type without necessitating radical change in the construction thereof and without unduly altering the advantageous or characteristic appearance of the same, and which preferably automatically corresponds the view finder of the camera with the photographic lenses as they are selectively positioned for photographing.

The above objects and certain other objects, hereinafter appearing, are embodied in the preferred form of my invention, hereinafter fully described and illustrated in the accompanying drawings, and are effected by certain novel constructions, combinations and arrangements of parts particularly pointed out in the appended claims.

In the said drawings—

Figure 2 is a front elevation of the same;

Figure 3 is an enlarged top plan view with a portion broken away and shown in section on the line 3—3 of Figure 2; and Figure 4 is an enlarged partial section on the line 4—4 of Figure 2.

Like characters of reference indicate like parts in the several views.

Figure 1:
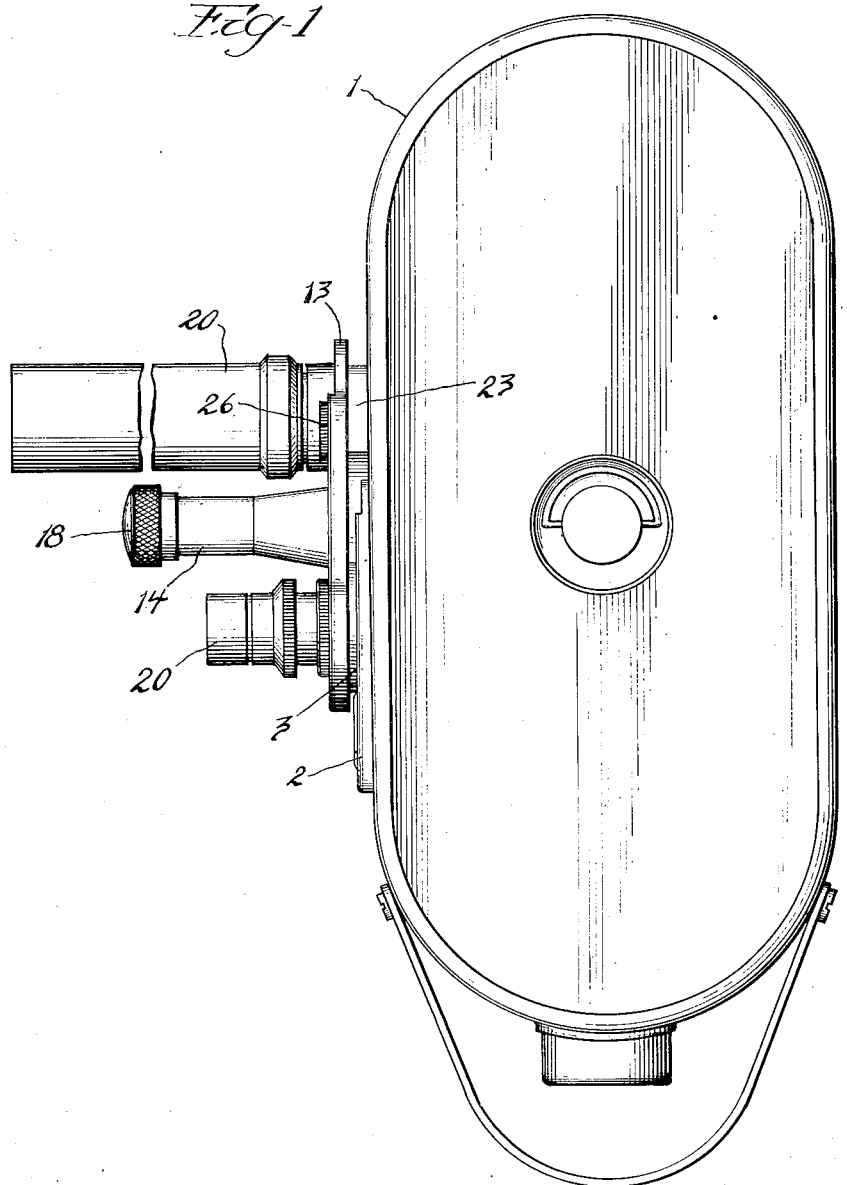
Figure 1 is a side elevation of a motion picture camera of the above mentioned type and embodying my invention.

Referring to the drawings, 1 designates generally a vertically elongated transversely narrow motion picture camera case at the intermediate portion of the front of which is secured, in a suitable manner, a housing member 2.

The housing member 2 is provided adjacent one side of the case with an opening in which a bushing 3 is screwthreaded and which provides a light opening 4 alined with an exposure aperture 5 in a front face guide plate 6 of an intermittent film feed guide within the camera. See Figures 3 and 4.

Extending forwardly and rearwardly through the case 1, and accordingly disposed between the side planes of the case, is a view finder tube 7 which is disposed in adjacent transversely spaced parallelism with the focal axis of the camera with which the light opening 4 and the exposure aperture 5 are registered. See Figure 3.

The rear end of the finder tube 7 is provided with a suitable lens 8 and disposed at the front end of the tube is a bushing 9 carrying a mask 10 having an opening corresponding with the exposure aperture 5. See Figures 2 and 3.

A stud 12 is carried on and projects forwardly from the front of the case 1 and is disposed intermediate the side planes of the case and is vertically spaced above the view finder structure and the focal axis of the camera. See Figure 4.

A lens carrier 13 is provided with a central forwardly projecting bored hub 14 having the bore thereof rearwardly reduced, as designated at 15, and engaged on the stud. A headed screw 16 is screwthreaded into the forward end of the stud and has its head movably engaged in the bore of said hub, whereby the carrier is mounted on the stud for axial movement along the focal axis of the camera and for angular movement on an axis parallel thereto.

A helical compression spring 17 is arranged on the stud 12 between the head of the screw 16 and the reduced portion 15 of the bore of the hub 14, and engages the same to yieldably urge the carrier 13 rearwardly. A cap 18 is screwthreaded over the front end of the hub 14 and encloses the bore thereof.

The carrier 13 is provided with two diametrically opposite photographic lens mounts 19 in the form of screwthreaded apertures into which photographic lenses 20 are screwthreaded, and these lens mounts are disposed to register with the focal axis of the camera in the angular movement of the carrier whereby to selectively register the photographic lenses with the focal axis for photographing therewith.

The carrier 13 is provided with circular rearwardly projecting exteriorly shouldered formations 21 disposed coaxially with the lens mounts 19, and the bushing 3 is provided with a forwardly facing bore formation 22 into which the formations 21 are engageable, when their lens mounts are registered with the focal axis of the camera, with rearward positioning of the carrier 13, as shown in Figures 3 and 4.

Thus, the carrier 13 is predeterminately located in its positions where a lens mount is registered with the focal axis of the camera, the spring 17 maintaining the carrier in its rearward position.

When it is desired to interchange the lenses on the camera with reference to the focal axis of the camera, the carrier is moved forwardly against the spring 17, by grasping the cap 18, to disengage the circular formation 21 engaged with the bore formation 22 after which the carrier is moved angularly to bring the other lens mount in registry with the focal axis of the camera, the circular formation 21 of the other lens being engaged with the bore formation 22 by permitting the spring 17 to move the carrier rearwardly.

A forwardly facing bore formation 23 in the form of a cup is secured on the front of the case 1 by a headed screw 24 and is disposed to be engaged with the exteriorly shouldered circular formation 21 of the lens mount which is not in registry with the focal axis, thus balancing the carrier with reference to the pressure of the spring 17 and closing the rear end of the photographic lens which is not registered with the focal axis of the camera. See Figures 2 and 4.

The lens carrier 13 is also provided with two diametrically opposite view finder lens mounts 25 in the form of screw-threaded apertures in which view finder lenses 26 are screwthreaded, and these view finder lens mounts are disposed to register with the view finder tube 7 when a corresponding photographic lens 20 is registered with the focal axis of the camera. See Figures 2 and 3.

The photographic lenses 20 are of different characteristics, so that by interchanging them with reference to the focal axis of the camera different photographic conditions may be met with convenience. The view finder lenses 26 are likewise different and each corresponds with the photographic lens which is in photographing position when this view finder lens is in registry with the tube 7.

As a result the view finder is automatically corresponded with the photographic lens which is in photographing position.

The arrangement is such that the carrier 13 lies substantially within the side planes of the case 1 whereby the advantageous and characteristic narrowness and appearance of the camera is not unduly altered.

While I have herein shown and particularly described the preferred embodiment of my invention I do not wish to be limited to the precise details of construction shown as changes may readily be made without departing from the spirit of my invention, but having thus described my invention, I claim as new and desire to secure by Letters Patent the following:

1. The combination with a photographic camera provided with a case relatively narrow transversely, of a lens carrier at the front of the camera and mounted thereon for angular movement on an axis vertically spaced from the focal axis of the camera and provided with two diametrically opposite photographic lens mounts disposed for selective registry with said focal axis in said movement of said carrier, said carrier lying substantially within the side planes of said case when in lens mount registering positions.

2. The combination with a photographic camera provided with a case relatively narrow transversely and provided with a view finder structure within the side planes of the case, of a lens carrier at the front of the camera and mounted thereon for angular movement on an axis parallel to the focal axis of the camera and the axis of said finder structure and vertically spaced therefrom, said carrier being provided with two diametrically opposite photographic lens mounts disposed for selective registry with said focal axis and provided with two diametrically opposite view finder element mounts disposed for registry with said finder structure when the corresponding photographic lens mounts are in registry with said focal axis, said carrier lying substantially within the side planes of the case when in lens mount registering positions.

3. The combination with a photographic camera provided with a case relatively narrow transversely and provided with a view finder structure including a forwardly disposed mask within the side planes of said case and disposed in adjacent transversely spaced parallelism with the focal axis of the camera, of a lens carrier at the front of the camera and mounted thereon for angular movement on an axis vertically spaced from and parallel to the focal axis of the camera, said carrier being provided with two diametrically opposite photographic lens mounts and disposed for selective registry with said focal axis and provided with two diametrically opposite view finder lens mounts disposed for registry with said finder structure when the corresponding photographic lens mounts are in registry with said focal axis, said carrier lying substantially within the side planes of said case when in lens mount registering positions.

4. The combination with a photographic camera provided with a case relatively narrow transversely and provided with a view finder structure within the side planes of the case, a forwardly projecting stud on the camera and disposed intermediate the side planes of the case, a lens carrier mounted for angular movement on said stud and provided with two diametrically opposite photographic lens mounts disposed for selective registry with the focal axis of the camera and provided with two diametrically opposite view finder element mounts disposed for registry with said finder structure when the corresponding photographic lens mounts are in registry with said focal axis, said carrier lying substantially within the side planes of the case when in lens mount registering positions.

5. The combination in a photographic camera provided with a case relatively narrow transversely and provided with a view finder structure within the side planes of said case and disposed in adjacent transversely spaced parallelism with the focal axis of the camera, a forwardly projecting stud on the camera and disposed intermediate the side planes of the case and vertically spaced from said focal axis and said view finder structure, a lens carrier mounted for angular movement on said stud and provided with two diametrically opposite photographic lens mounts disposed for selective registry with said focal axis and provided with two diametrically opposite view finder lens mounts disposed for registry with said finder structure when the corresponding photographic lens mounts are in registry with said focal axis, said carrier lying substantially within the side planes of the case when in lens mount registering positions.

In witness whereof I hereunto affix my signature this 6th day of December, 1929.

ALBERT S. HOWELL.